UNITED STATES PATENT OFFICE.

CARLETON ELLIS AND ALFRED A. WELLS, OF MONTCLAIR, NEW JERSEY, ASSIGNORS TO NATIONAL CARBON COMPANY, OF LONG ISLAND CITY, NEW YORK, A CORPORATION OF NEW JERSEY.

PROCESS OF MAKING MANGANESE DIOXID.

1,269,915.  Specification of Letters Patent.  Patented June 18, 1918.

No Drawing.  Application filed December 6, 1916.  Serial No. 135,405.

*To all whom it may concern:*

Be it known that we, CARLETON ELLIS and ALFRED A. WELLS, citizens of the United States, residing at Montclair, in the county of Essex and State of New Jersey, have invented certain new and useful Improvements in Processes of Making Manganese Dioxid, of which the following is a specification.

This invention relates to a process of making manganese dioxid or other higher oxid of manganese material suitable as a depolarizing agent for dry batteries of the Leclanché type and other similar purposes and also relates to the product of such process; all as more fully hereinafter described and as claimed.

The invention is particularly concerned with the production of a special form of depolarizing material characterized in its preferred form by a particular shade of color, namely: a gray or ashy colored product. This preferred form of the material is prepared, for example, by the treatment of a solution of manganese chlorid with sodium hypochlorite in the presence of small amounts of hydrochloric acid, while subjecting such solution to a boiling temperature over a considerable period and in subsequently preferably grinding the higher oxid of manganese obtained in this manner, which grinding stage is preferably carried out for a protracted period in a ball or pebble mill; whereby a gray or ash colored product usually of more or less flaky character, may be obtained. For example, in one case such a product was obtained by preparing a mixture of 10 volumes of manganese chlorid solution of 44% strength, 25 volumes of sodium hypochlorite solution of 30% strength, 11 volumes of hydrochloric acid of 10% strength and 9 volumes of water. This solution was heated to the boiling point and for about one-half hour no precipitation occurred. Soon thereafter a dark ashy gray precipitate formed which was collected, washed and dried. Washing with dilute nitric acid may be carried out when required.

In another case 8.57 ounces of manganese chlorid in the hydrated form ($4H_2O$), 15 ounces of sodium hypochlorite solution, .24 ounce of hydrochloric acid and 48 ounces of water were heated for five hours to the boiling point and the precipitate obtained was thoroughly washed. Owing to its physical character the washing was carried out very readily. The material was dried at 110° C. and was of a dark ashy color.

The grinding stage of treatment of material of this character is carried out, with for example, pebble or ball mills as stated and from three to five hours' grinding yields products of a grayer tone than that obtained by the precipitation stage alone and also tends more or less to flake the material forming lamellæ, which when associated with a lamellar form of graphite may be compressed to form a depolarizing mass of excellent depolarizing activity and permanency. The flaky condition may be enhanced by passage through heavy rolls.

In boiling the solution containing free hydrochloric acid, there is a tendency to loss of acid by volatilization hence although acid is liberated by the reaction forming manganese dioxid, the acid strength of the solution may be less after protracted boiling than at the start, all depending on the various conditions to which the material is subjected.

The product obtained by the foregoing illustrative procedure is a substantially pure manganese dioxid product, although in some cases a greater or less amount of manganites may be present. The more nearly conversion to manganese dioxid is approached the better hydrated the product, and the electrical conductivity, which with this ash or gray colored product is extremely good, is further increased by such degree of hydration, together with more complete oxidation of the raw material used. Such a product may be admixed with graphite in the requisite proportions to form a depolarizing mass of efficient conductivity and depolarizing activity. This mixture may be molded into suitable shapes for use in dry batteries and the like. A lamellar gray or mouse colored manganese dioxid or higher oxid of manganese of good electrical conductivity admixed with a flaky form of graphite may be molded into an efficient depolarizing mass. The extraction with water and with dilute nitric acid mentioned above frees the product from water soluble and acid soluble salts and leaves it in better condition for the purposes of use as a depolarizing agent than when such extraction is not carried out.

In the foregoing process it should be noted that the use of manganous chlorid and hydrochloric acid as an acidifying agent in the solution which is being oxidized involves the presence of a relatively volatile acid. During the protracted boiling necessary to effect the substantial completion of the reaction a considerable amount of hydrochloric acid is removed while at the same time the reaction itself liberates hydrochloric acid so that although the solution is being strengthened by hydrochloric acid which is being liberated by the reaction the free acid is being removed by volatilization so that by adjusting the degree of ebullition (adding water from time to time if necessary) the hydrochloric acid may be removed at the same rate in which it is liberated or at an even greater rate so that the acid strength diminishes as the reaction progresses. In a similar manner the salts of other volatile acids and the like may be employed when of a compatible nature for the purposes hereof and likewise various other oxidizing agents than hypochlorite solution may be employed. The hydrochloric acid may be substituted in whole or in part by other acidulating agents appropriate for the purposes hereof.

The degree of hydration of the foregoing product may be regulated by gentle heating at temperatures between 100° and 200° or higher or lower, for varying period, to give products more or less dehydrated.

What we claim is:—

1. The process of making a gray or ash colored higher oxid of manganese depolarizing material comprising heating a solution of hypochlorite and manganous chlorid slightly acidified with hydrochloric acid, and in collecting and grinding the precipitate.

2. The process of making a gray or ash colored higher oxid of manganese depolarizing material comprising heating a solution of manganous chlorid, slightly acidified with hydrochloric acid, with hypochlorite, with consequent elimination of free hydrochloric acid therefrom, in collecting the precipitate and grinding to a flaky texture.

3. The process of making a gray or ash colored higher oxid of manganese depolarizing material comprising heating a solution of a manganous salt, slightly acidified with hydrochloric acid, with hypochlorite, in collecting and grinding the same.

4. The process of making a dark ash colored manganese dioxid which comprises oxidizing manganous chlorid in an aqueous solution slightly acidified with hydrochloric acid in the presence of hypochlorite oxidizing agent, in maintaining the solution at the boiling temperature until a substantial amount of dark ash colored precipitate has formed, in collecting and washing same and in subjecting to protracted grinding; whereby ashy gray manganese dioxid material is obtained.

5. The process of making an ash colored manganese dioxid which comprises oxidizing manganous chlorid in aqueous solution slightly acidified with hydrochloric acid in the presence of hypochlorite oxidizing agent, in maintaining the solution at the boiling temperature with consequent elimination of free hydrochloric acid therefrom, until a substantial amount of ashy gray precipitate has formed, and in collecting and washing same.

6. The process of making an ash colored manganese dioxid which comprises oxidizing a manganous salt in aqueous solution slightly acidified with hydrochloric acid in the presence of hypochlorite oxidizing agent, in maintaining the solution at the boiling temperature whereby a substantial amount of ashy gray precipitate is formed and the acid strength of the solution is modified, and in collecting and washing the precipitate.

7. The process of making an ash colored manganese dioxid which comprises oxidizing manganese chlorid in aqueous solutions slightly acidified with hydrochloric acid in the presence of hypochlorite oxidizing agent, and in maintaining the solution at the boiling temperature while diminishing the amount of free acid present, whereby a substantial amount of ashy gray precipitate is formed.

8. As a depolarizing material an ash colored higher oxid of manganese.

In testimony whereof we have affixed our signatures.

CARLETON ELLIS.
ALFRED A. WELLS.